United States Patent
Castillo

(10) Patent No.: US 9,562,599 B2
(45) Date of Patent: Feb. 7, 2017

(54) CAM MECHANISM FOR TUNING OF STRING-DAMPERS ON HINGED COMPARTMENTS

(71) Applicant: GM Global Technology Operations LLC, Detroit, MI (US)

(72) Inventor: Brian V. Castillo, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 5 days.

(21) Appl. No.: 14/589,307

(22) Filed: Jan. 5, 2015

(65) Prior Publication Data

US 2016/0195180 A1     Jul. 7, 2016

(51) Int. Cl.
*F16H 53/02* (2006.01)
*B60R 7/06* (2006.01)
*E05F 5/02* (2006.01)
*E05F 5/08* (2006.01)
*E05D 1/04* (2006.01)

(52) U.S. Cl.
CPC .............. *F16H 53/02* (2013.01); *B60R 7/06* (2013.01); *E05F 5/02* (2013.01); *E05F 5/08* (2013.01); *E05D 1/04* (2013.01); *E05Y 2201/21* (2013.01); *E05Y 2201/266* (2013.01); *E05Y 2201/654* (2013.01); *E05Y 2900/538* (2013.01)

(58) Field of Classification Search
CPC ............ F16H 53/02; E05D 11/06; E05D 1/04; B60R 7/06
USPC .................... 296/37.12, 37.1, 37.8
See application file for complete search history.

(56) References Cited

U.S. PATENT DOCUMENTS

| | | | | |
|---|---|---|---|---|
| 5,275,456 | A * | 1/1994 | Ishii | B60R 7/06 16/85 |
| 7,114,758 | B2 * | 10/2006 | Ichioka | B60R 7/04 296/37.12 |
| 2006/0027696 | A1 * | 2/2006 | Okabayashi | B65H 75/4442 242/379.1 |
| 2006/0097534 | A1 * | 5/2006 | Adams | B60R 7/06 296/37.1 |
| 2012/0200107 | A1 * | 8/2012 | Kobayashi | B60R 7/06 296/37.12 |

\* cited by examiner

*Primary Examiner* — Jason S Morrow
*Assistant Examiner* — E Turner Hicks
(74) *Attorney, Agent, or Firm* — BrooksGroup

(57) ABSTRACT

A number of variations may include a product comprising a cam guide mechanism for use with a string-damper comprising a body, wherein the body includes a profiled surface and a groove extending along the profiled surface.

18 Claims, 4 Drawing Sheets

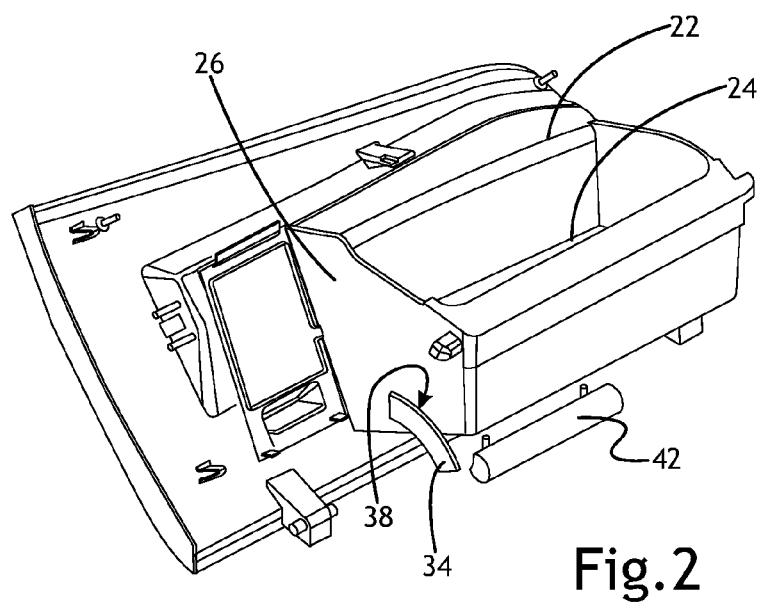
Fig.2
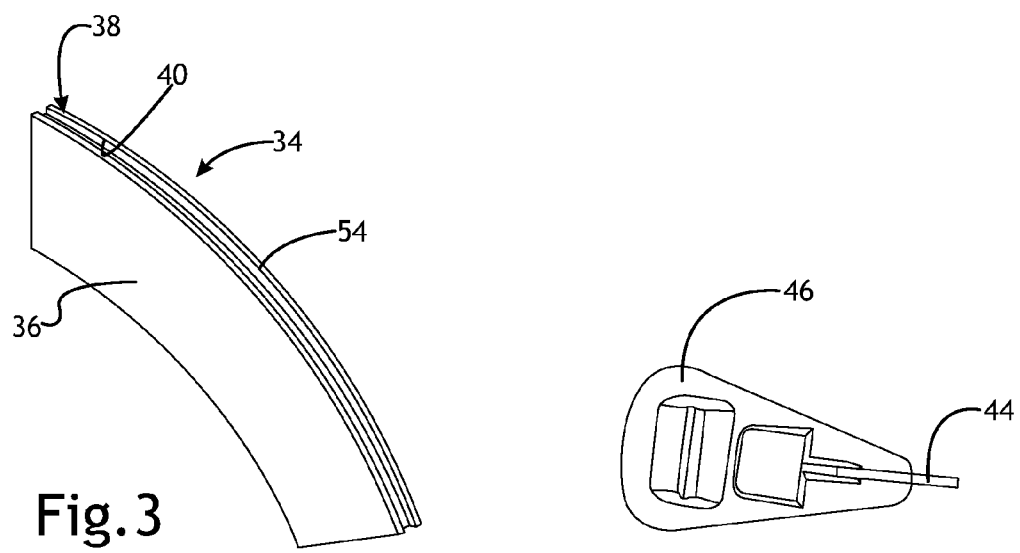
Fig.3
Fig.4

CAM MECHANISM FOR TUNING OF STRING-DAMPERS ON HINGED COMPARTMENTS

TECHNICAL FIELD

The field to which the disclosure generally relates to includes string-dampers.

BACKGROUND

String-dampers may be used on a number of variations of hinged compartments.

SUMMARY OF ILLUSTRATIVE VARIATIONS

One variation may include a product comprising: a cam guide mechanism for use with a string-damper comprising a body, wherein the body includes a profiled surface and a groove extending along the profiled surface.

Another variation may include a product comprising: a glove box hinged compartment with a cam guide mechanism for a string-damper, wherein the cam guide mechanism is attached to the hinged compartment.

Another variation may include a method comprising: tuning of a string-damper for a hinged mechanism comprising: providing a cam guide mechanism with a profiled surface on a moving component of a hinged mechanism; wrapping a string from the string-damper around the profiled surface on the cam guide mechanism and attaching the string to the moving component of the hinged mechanism; and controlling the direction of the string throughout the movement of the hinged mechanism with the profiled surface.

Other illustrative variations within the scope of the invention will become apparent from the detailed description provided hereinafter. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein:

FIG. 2 illustrates a rear perspective view of a hinged compartment according to a number of variations.

FIG. 3 illustrates a perspective view of a cam guide mechanism according to a number of variations.

FIG. 4 illustrates a perspective view of an anchor clip according to a number of variations.

DETAILED DESCRIPTION OF ILLUSTRATIVE VARIATIONS

The following description of the variations is merely illustrative in nature and is in no way intended to limit the scope of the invention, its application, or uses.

Figure 1:
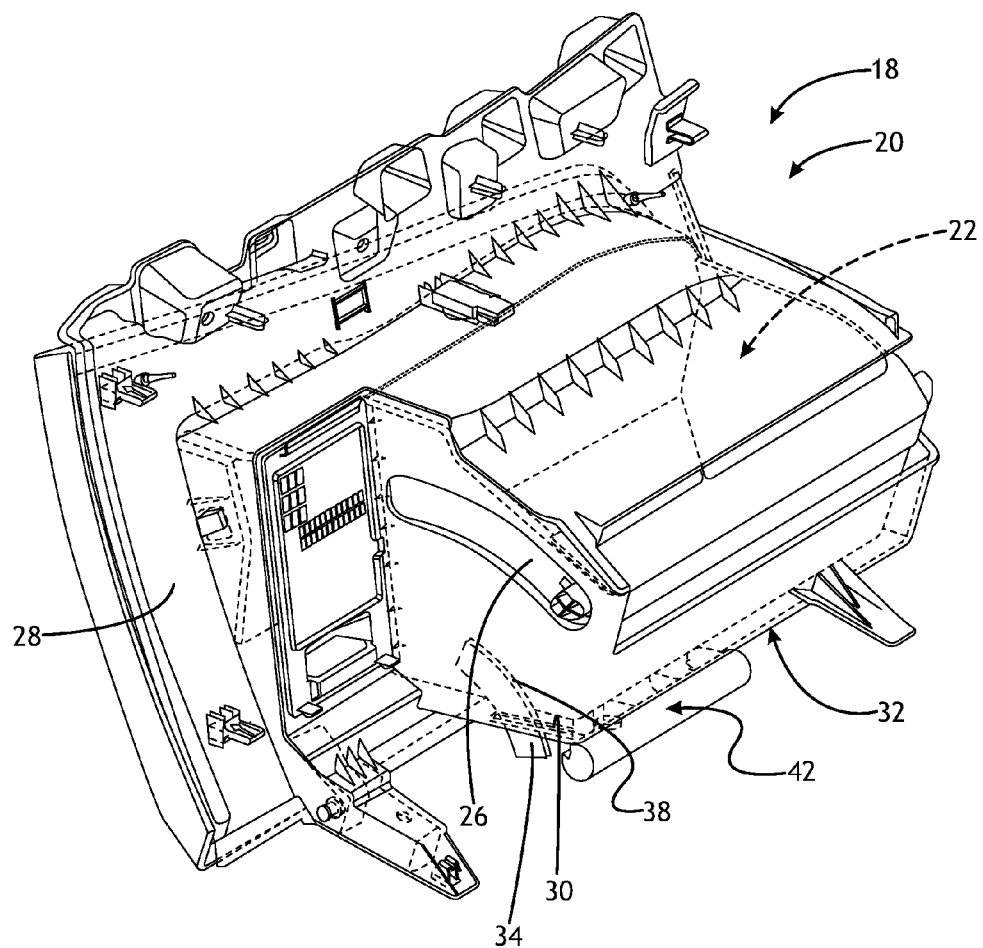
FIG. 1 illustrates a rear perspective view of a hinged mechanism according to a number of variations.
Figure 5:
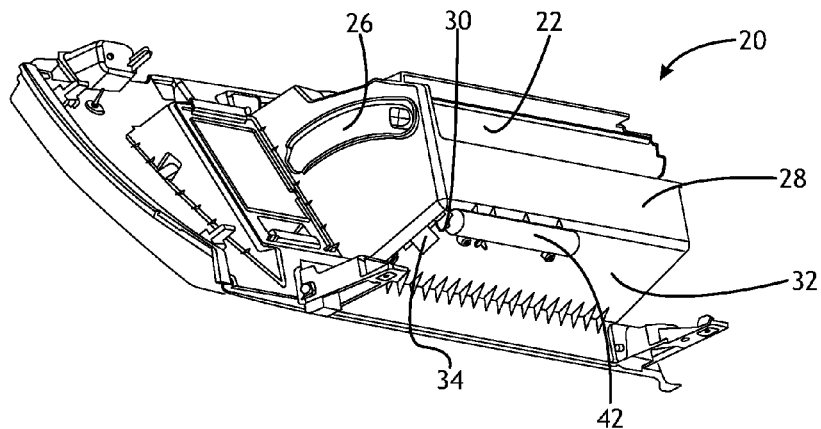
FIG. 5 illustrates a rear perspective view of a hinged mechanism according to a number of variations.
Figure 6:
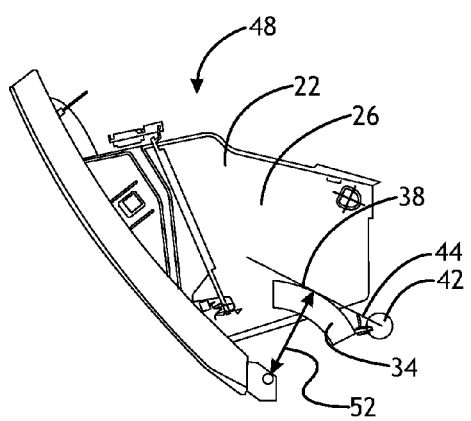
FIG. 6 illustrates a side view of a hinged mechanism in a closed position according to a number of variations.
Figure 7:
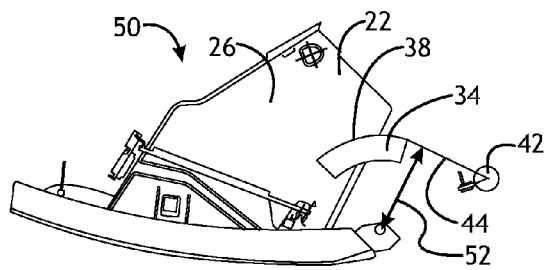
FIG. 7 illustrates a side view of a hinged mechanism in an open position according to a number of variations.

FIG. 1 illustrates a number of variations including a hinged mechanism 18 which may include a string-damper 42. In a number of variations, the string-damper 42 may be used to dampen the opening of a hinged mechanism 18. In a number of variations, a cam guide mechanism 34 may be used to assist in matching or tuning the damping moment of a string-damper 42 with the opening moment of the hinged mechanism 18 throughout its travel by controlling the effective moment arm 52 (variations of which are illustrated in FIGS. 6 and 7). The effective moment arm 52 may be the perpendicular distance between the string 44 from the string-damper 42 and the hinge axis. In a number of variations, the cam guide mechanism 34 may be constructed and arranged so that the effective moment arm 52 may remain constant throughout travel of the hinged mechanism 18, increase throughout travel of the hinged mechanism 18, and/or decrease throughout travel of the hinged mechanism 18. A vehicle glove box 20 is discussed below for illustrative purposes only and it is noted that the cam guide mechanism 34 may be used on any number of hinged mechanisms including, but not limited to, a center counsel and/or any variation of storage compartments or mechanisms utilizing a string-damper.

FIGS. 3, 4, 6-9 illustrate a number of variations. In one variation, the cam guide mechanism 34 may include a body 36 which may include a profiled surface 38 which may be any number of shapes depending on the design requirements of the application. In a number of variations, the profiled surface 38 on the cam guide mechanism 34 may allow for tuning of the string-damper 42 performance as the direction of the string 44 may be controlled with the profiled surface 38 throughout travel of the hinged mechanism 18 which may control the effective moment arm 52. The cam guide mechanism 34 may be constructed and arranged so that the effective moment arm 52 may remain constant throughout travel of the glove box 20 from a closed position 48 to an open position 50, variations of which are illustrated in FIGS. 6 and 7. In another variation, the cam guide mechanism 34 may be constructed and arranged to increase and/or decrease the effective moment arm 52 throughout travel of the glove box 20 from a closed position 48 to an open position 50.

Figure 8:
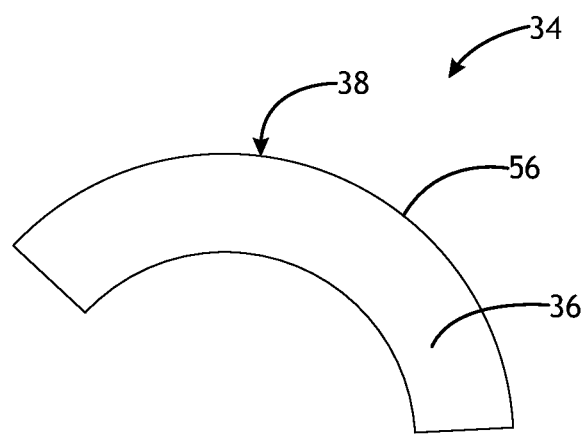
FIG. 8 illustrates a side view of a cam guide mechanism according to a number of variations.
Figure 9:
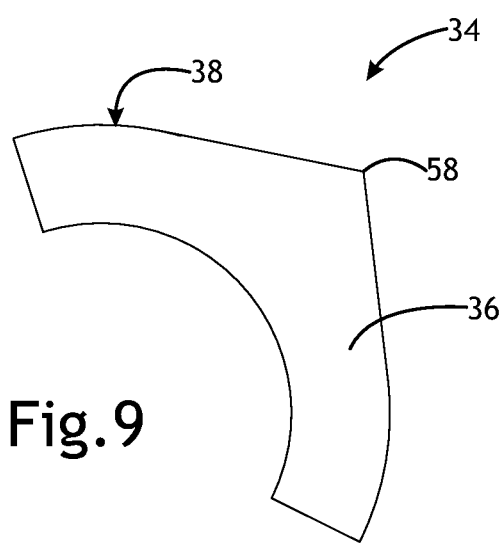
FIG. 9 illustrates a side view of a cam guide mechanism according to a number of variations.

In a number of variations, the profiled surface 38 may be a smooth continuous radius surface 54 including, but not limited to, a circular arc, a variation of which is illustrated in FIG. 3, which may provide a constant effective moment arm 52 as the hinged mechanism 18 opens. In another variation, the profiled surface 38 may include a variable radius shape 56, a variation of which is illustrated in FIG. 8, including, but not limited to, an ellipse shape, an oval shape, or an egg-like shape so that the effective moment arm 52 may be tuned to change as the hinged mechanism 34 may open. In yet another variation, the profiled surface 38 may include a corner shape feature 58, a variation of which is illustrated in FIG. 9, which may also be used to vary the effective moment arm 52. In any number of variations, any of the shapes noted above may be combined to form the profiled surface 38. In a number of variations, the profiled surface 38 may include a groove or indentation 40 which may extend across the length of the profiled surface 38 and which may be constructed and arranged to house a string 44 from the string-damper 42 and to prevent the string 44 from disengaging from the cam guide mechanism 34.

FIGS. 1-7 illustrate a number of variations. In one variation, a glove box 20 may include a hinged compartment 22 and a glove box frame 28. The hinged compartment 22 may include a storage unit 24, a variation of which is illustrated in FIG. 2. In a number of variations, the cam guide mechanism 34 may be attached to a first side 26 of the hinged compartment 22 of the glove box 20. In one variation, the cam guide mechanism 34 may be a separate component which may be attached to the hinged compartment 22 of the glove box 20 in any number of variations including, but not limited to, one or more mechanical fasteners, an adhesive, and/or a snap/lock feature on the hinged compartment 22 and the cam guide mechanism. In another variation, the cam guide mechanism 34 may be integrated into the hinged compartment 22 of the glove box 20 so that it is one continuous uninterrupted component. In a number of variations, the cam guide mechanism 34 may be molded with the hinged compartment 22.

In a number of variations, the hinged compartment 22 may be constructed and arranged to pivotally mate with the glove box frame 28 so that the hinged compartment 22 may pivot open and away from a portion of the glove box frame 28 which may allow the glove box 20 to be opened or closed. In a number of variations, the glove box frame 28 may include an opening 30 which may be constructed and arranged so that the cam guide mechanism 34 may extend through the glove box frame 28, a variation of which is illustrated in FIG. 1. In a number of variations, a string-damper 42 may be attached to a bottom surface 32 of the glove box frame 28, a variation of which is also illustrated in FIG. 1. In a number of variations, a string 44 may extend from the string-damper 42 through the opening 30 in the glove box frame 28, over the cam guide mechanism 34, and may be anchored onto the hinged compartment 22. The string 44 may be anchored to the first side 26 of the hinged compartment 22 adjacent the cam guide mechanism 34. Any number of anchorage devices 46 may be used to attach the string 44 to the hinged compartment 22 including, but not limited to, a clip, a variation of which is illustrated in FIG. 4. The anchorage device 46 may be stationary or it may be pivoting. The string 44 may then move fore and aft within the groove 40 in the cam guide mechanism 34 when the glove box 20 is opened and closed.

In a number of variations, the profiled surface 38 of the cam guide mechanism 34 may allow the direction of the string 44 to be adjusted which may adjust the force applied to the glove box 20 from the string 44. The profiled surface 38 of the cam guide mechanism 34 may be constructed and arranged so that when the glove box 20 is initially opened the string-damper 42 provides low damping and as the glove box 20 continues to open the damping progressively increases. This may allow for a reasonably uniform opening speed as the glove box 20 hinged compartment 22 travels from a fully closed position 48, a variation of which is illustrated in FIG. 6, to a fully opened position 50, a variation of which is illustrated in FIG. 7. This may allow a glove box 20 to be tuned so that over-damping at the beginning of travel may be avoided and/or under damping at the end of travel may be avoided. The use of the cam guide mechanism 34 may also allow the use of a standard string-damper 42 on a variety of hinged mechanisms 18, as the spring rate of the standard string-damper 42 may be controlled and tuned with the cam guide mechanism 34 without the need to individually tune the spring rates of each individual string-damper 42.

The following description of variants is only illustrative of components, elements, acts, products and methods considered to be within the scope of the invention and are not in any way intended to limit such scope by what is specifically disclosed or not expressly set forth. The components, elements, acts, products and methods as described herein may be combined and rearranged other than as expressly described herein and still are considered to be within the scope of the invention.

Variation 1 may include a product comprising: a cam guide mechanism for use with a string-damper comprising a body, wherein the body includes a profiled surface and a groove extending along the profiled surface.

Variation 2 may include a product as set forth in Variation 1 wherein the profiled surface is at least one of a smooth continuous radius shape, a variable radius shape, or a corner shape.

Variation 3 may include a product as set forth in any of Variations 1-2 further comprising a hinged mechanism, wherein the cam guide mechanism is attached to a moving component of the hinged mechanism.

Variation 4 may include a product as set forth in any of Variations 1-3 wherein the profiled surface is constructed and arranged to increase damping of the hinged mechanism as the hinged mechanism moves from a closed position to an open position.

Variation 5 may include a product as set forth in any of Variations 1-4 wherein a string-damper is attached to a stationary component of the hinged mechanism, and wherein a string from the string-damper extends within the groove on the profiled surface and is attached to the moving component of the string-damper.

Variation 6 may include a product as set forth in any of Variations 1-5 wherein the hinged mechanism is a glove box.

Variation 7 may include a product as set forth in any of Variations 1-6 wherein the cam guide mechanism and the moving component of the hinged mechanism is one continuous uninterrupted piece.

Variation 8 may include a product as set forth in any of Variations 1-7 wherein the cam guide mechanism and the moving component of the hinged mechanism are molded.

Variation 9 may include a product comprising: a glove box hinged compartment with a cam guide mechanism for a string-damper, wherein the cam guide mechanism is attached to the hinged compartment.

Variation 10 may include a product as set forth in Variation 9 wherein the cam guide mechanism includes a profiled surface.

Variation 11 may include a product as set forth in any of Variations 9-10 wherein the profiled surface is at least one of a smooth continuous radius shape, a variable radius shape, or a corner shape.

Variation 12 may include a product as set forth in any of Variations 9-11 wherein the cam guide mechanism and the hinged compartment are one single continuous unit.

Variation 13 may include a product as set forth in any of Variations 9-12 wherein the cam guide mechanism and the hinged compartment are molded.

Variation 14 may include a product as set forth in any of Variations 9-13 further comprising a glove box frame which is constructed and arranged to remain stationary in a vehicle, wherein the string-damper is attached to the glove box frame, and wherein a string from the string-damper extends over the cam guide mechanism and is attached to the hinged compartment.

Variation 15 may include a product as set forth in any of Variations 9-14 wherein the string is attached to the hinged compartment with an anchor clip, and wherein the anchor clip is stationary.

Variation 16 may include a product as set forth in any of Variations 9-15 wherein the string is attached to the hinged compartment with an anchor clip, and wherein the anchor clip pivots.

Variation 17 may include a method comprising: tuning of a string-damper for a hinged mechanism comprising: providing a cam guide mechanism with a profiled surface on a moving component of the hinged mechanism; wrapping a string from the string-damper around the profiled surface on the cam guide mechanism and attaching the string to the moving component of the hinged mechanism; and controlling the effective moment arm throughout the movement of the hinged mechanism with the profiled surface.

Variation 18 may include a method as set forth in Variation 17 wherein the profiled surface is at least one of a smooth continuous radius shape, a variable radius shape, or a corner shape.

Variation 19 may include a method as set forth in any of Variations 17-18 wherein the hinged mechanism is a glove box.

Variation 20 may include a method as set forth in any of Variations 17-19 wherein the profiled surface of the cam mechanism is constructed and arranged to increase damping of the hinged mechanism as the hinged mechanism moves from a closed position to an open position.

The above description of select variations within the scope of the invention is merely illustrative in nature and, thus, variations or variants thereof are not to be regarded as a departure from the spirit and scope of the invention.

What is claimed is:

1. A product comprising:
   a glove box hinged compartment comprising a first side surface, a second side surface, and a bottom surface; and a cam guide mechanism for a string-damper, wherein the cam guide mechanism is attached directly to the first side surface of the hinged compartment.

2. The product of claim 1 wherein the cam guide mechanism includes a profiled surface.

3. The product of claim 2 wherein the profiled surface is at least one of a smooth continuous radius shape, a variable radius shape, or a corner shape.

4. The product of claim 1 wherein the cam guide mechanism and the hinged compartment are one single continuous unit.

5. The product of claim 4 wherein the cam guide mechanism and the hinged compartment are molded.

6. The product of claim 1 further comprising a glove box frame which is constructed and arranged to remain stationary in a vehicle, wherein the string-damper is attached to the glove box frame, and wherein a string from the string-damper extends over the cam guide mechanism and is attached to the hinged compartment.

7. The product of claim 6 wherein the string is attached to the hinged compartment with an anchor clip, and wherein the anchor clip is fixed to the hinged compartment so that the anchor clip does not rotate on the hinged compartment.

8. The product of claim 6 wherein the string is attached to the hinged compartment with an anchor clip, and wherein the anchor clip is attached to the hinged compartment so that the anchor clip rotates on the hinged compartment.

9. A method comprising:
   tuning of a string-damper for a hinged mechanism comprising:
   providing a cam guide mechanism with a profiled surface on a side surface of a moving component of the hinged mechanism;
   wrapping a string from the string-damper around the profiled surface on the cam guide mechanism and attaching the string to the moving component of the hinged mechanism; and
   controlling the effective moment arm throughout the movement of the hinged mechanism with the profiled surface.

10. The method of claim 9 wherein the profiled surface is at least one of a smooth continuous radius shape, a variable radius shape, or a corner shape.

11. The method of claim 9 wherein the hinged mechanism is a glove box.

12. The method of claim 9 wherein the profiled surface of the cam mechanism is constructed and arranged to increase damping of the hinged mechanism as the hinged mechanism moves from a closed position to an open position.

13. A hinged compartment for a vehicle comprising:
    a hinged compartment comprising a first side surface, a second side surface, and a bottom surface, and wherein the first side surface includes a cam mechanism having a groove;
    a hinged compartment frame constructed and arranged to remain stationary in the vehicle; and
    a string-damper attached to the hinged compartment frame, wherein a first end of a string from the string-damper is attached to the first side surface of the hinged compartment so that the string sits within the groove on the cam mechanism and is constructed and arranged so that the string moves fore and aft in relation to the cam mechanism as the hinged compartment is opened and closed.

14. The hinged compartment for the vehicle of claim 13 wherein the cam mechanism includes a profiled surface which is at least one of a smooth continuous radius shape, a variable radius shape, or a corner shape.

15. The hinged compartment for the vehicle of claim 14 wherein the profiled surface is constructed and arranged to increase damping of the hinged compartment as the hinged compartment moves from a closed position to an open position.

16. The hinged compartment for the vehicle of claim 13 wherein the hinged compartment is a glove box.

17. The hinged compartment for the vehicle of claim 13 wherein the cam mechanism and the hinged compartment are one continuous uninterrupted piece.

18. The hinged compartment for the vehicle of claim 17 wherein the cam mechanism and the hinged compartment are molded.

* * * * *